UNITED STATES PATENT OFFICE.

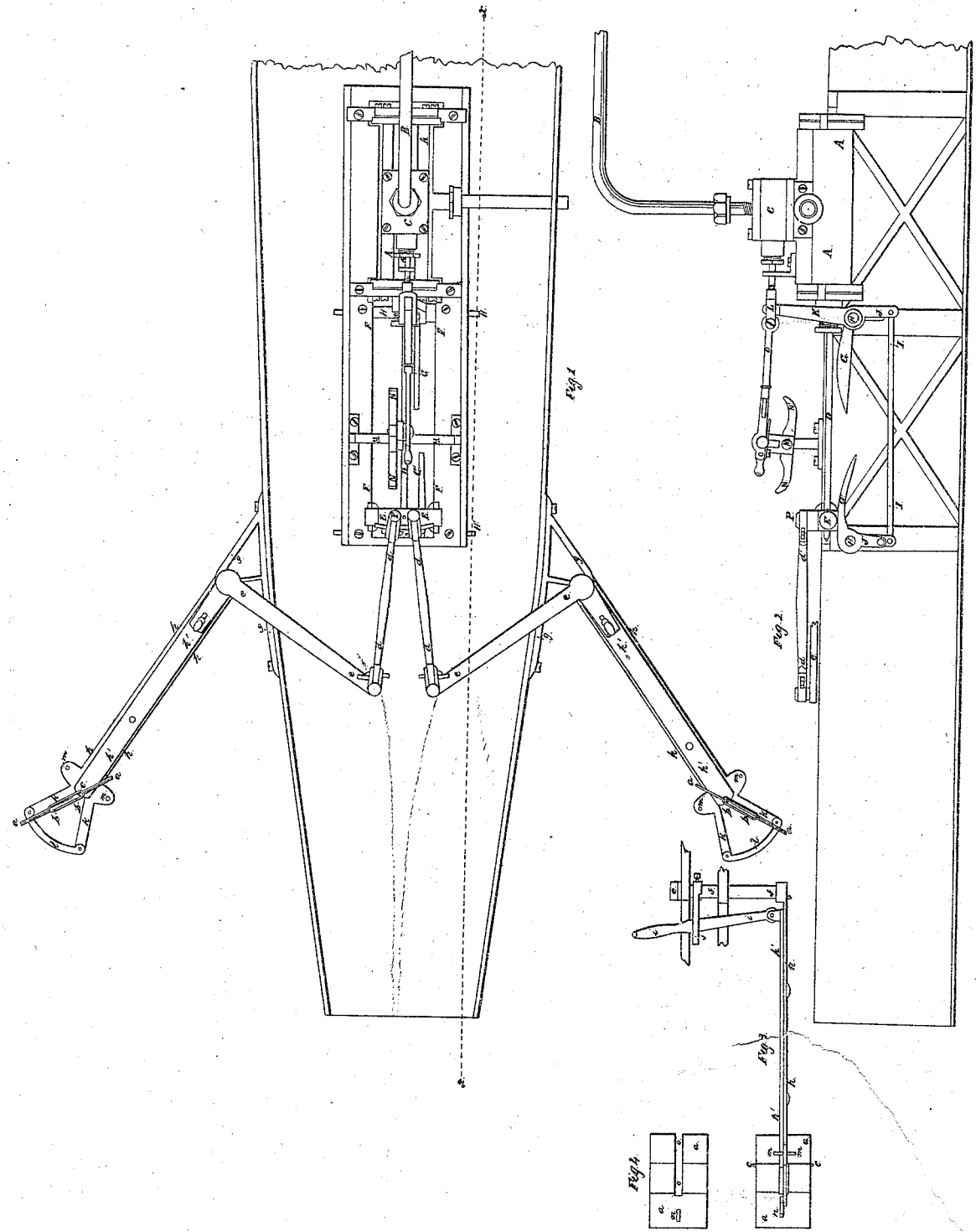

TRUMAN COOK, OF NEW YORK, N. Y.

MODE OF PROPELLING STEAMBOATS AND OTHER VESSELS.

Specification forming part of Letters Patent No. 2,623, dated May 12, 1842.

*To all whom it may concern:*

Be it known that I, TRUMAN COOK, of the city of New York, in the State of New York, have invented a new and useful Apparatus for Propelling Steamboats and other Vessels; and I do hereby declare that the following is a full and exact description thereof.

My propelling apparatus consists, usually, of two submerged vibrating paddles or sculls, which are actuated by means of a steam-engine, the piston of which engine is to traverse in its cylinder with a motion as nearly uniform as may be throughout its whole stroke instead of being governed in its motion by a rotating shaft and a crank or by any analogous device, as used in the ordinary reciprocating engine.

In the accompanying drawings, Figure 1 is a top view of a part of my boat, with the steam-engine and the paddles or sculls by which the boat is to be propelled. Fig. 2 is a vertical section through the boat in the line $x$ $x$ of Fig. 1; and Fig. 3 a side view of one of the paddles or sculls, the vibrating arm, and other parts with which it is connected.

A A is the steam-cylinder, B the steam-pipe connecting it with the boiler, and C the valve-box.

D is the piston-rod, which is attached to a cross-head E E, the ends of which cross-head embrace the guides F F in the usual manner.

G G' are two valve-shifters, the upper edges of which form inclined curves or planes, with each of which the under side of the cross-head E is alternately brought into contact. These valve-shifters are attached to rock-shafts H and H', and they are made to operate simultaneously, one rising as the other is depressed, by means of the connecting-rod I I, which works on joint-pins on the ends of the arms J J', said arms forming one piece with the valve-shifters G G'. From the shifter G rides the shifting-arm K, which passes through a mortise in the head L of the valve-stem, which it moves back and forth. In the position of the parts as shown in the drawings, the shifter G is raised and G' depressed. The inclined part of the valve-shifters G G' is so formed as to cause the valves to shift and to admit steam into the cylinder at either end alternately as the piston approaches near to but is not in contact with the heads, and by the elastic force of this steam so admitted the motion of the piston is effectually checked and all undue force upon the machinery is prevented. The piston being left free to act within the cylinder unimpeded by the retarding power of a crank or of any analogous device, commences and performs its returning stroke with a velocity that is necessary to the proper action of the propellers which I employ.

The following is the manner in which I operate the valve in cutting off the steam: M is a rock-shaft which carries two arms N N' and which work the valve-rod O for the purpose of cutting off the steam. The arms N N' stand horizontally when the steam is cut off; but, as shown in the drawings, the end N' is depressed, and the steam will then be entering one end of the cylinder; but as the piston moves inward a projecting pin or head P comes into contact with the lower side of the arm N', bringing its under side to a level, thus cutting off the steam. When the stroke of the piston brings the under side E of the cross-head into contact with the valve-shifter G, the steam will then be admitted to the cylinder, as above described, and will at the same time depress the end N of the cut-off arms and thus place it in a position to be acted on by the pin P and to cut off the steam at the return-stroke. The length of the arms N N' will determine the point at which the steam shall be cut off, as represented in the drawings. This would be effected at about two-thirds or three-fourths of the stroke of the piston.

In Fig. 1 $a$ $a$ is an edge view, and in Fig. 3 a side view, of my propellers. In Fig. 4 one of them is represented as removed from the arm by which it is carried. These paddles or sculls are formed of two plates of metal, so bent as to leave an opening or mortise through the whole width of each paddle and for one-third of its length, as shown at $b$ $b$. Through this opening or mortise passes a fulcrum-pin $c$, which may occupy either end of said mortise and thus change the fulcrum of the paddles.

In the ordinary manner of constructing my apparatus there are two paddles, one on each side of the boat, toward its stern. These paddles are submerged, and are carried by arms which vibrate horizontally, motion being communicated to them directly from the cross-head of the engine in the following manner: Connecting-rods $d\,d$ are attached by joint-pins to the cross-head at their inner ends, and at their outer they are similarly attached to arms $e\,e$, which are firmly affixed to vibrating vertical shafts $f\,f$, that have their bearings in stanchions or frames $g\,g$ on each side of the boat.

$h\,h$ are the arms that carry the paddles, which are in one piece with or firmly attached to the shaft $f\,f$ at their lower ends. The paddle-arms $h\,h$ consist of two plates or flat bars of metal, the uppermost of which, marked $h'\,h'$, slides lengthwise on the lowermost $h\,h$, the latter being that part which is made fast to the shaft $f\,f$. The fulcrum-pin $c\,c$ of the paddles is made fast to the outer end of the plate $h'\,h'$, and it can be shifted at pleasure, so as to occupy either end of the mortise or opening $b\,b$, thus shifting the fulcrum of the paddle so as to have either its longer or shorter portion toward the stern of the boat. In shifting the fulcrum $c$ I use a lever $i\,i$, which passes through a mortise in the piece $j$, and is jointed at its lower end to the sliding bar $h'\,h'$. The lower bar $h\,h$ is bifurcated or divided into two branches $k\,k$, which are connected together by a segment-arch $l$. Within the triangular space thus formed the paddle plays back and forth on its fulcrum, the sides $k\,k$ acting as stops to it when said fulcrum is situated as shown in the drawings. When the fulcrum $c$ is shifted to the opposite end of the mortise $b\,b$, the pins $m\,m$ become stops for the paddles, instead of that office being performed by the side pieces $k\,k$.

In Fig. 4, which represents a paddle separate from the arm which carries it, $n$ is an opening through which the segment-piece $l$ passes, and which checks the paddle and prevents its having an undue motion lengthwise. $o\,o$ is a slot or opening, which allows the paddle to play over the arms $h\,h$.

The position in which the paddles are represented in the drawings is that which they occupy in propelling the boat; but were the fulcrum-pin $c$ shifted so as to reverse the long and short ends of the paddles they would then be in a position to back instead of to drive the boat forward. It will be seen, therefore, that this effect will be produced by shifting the fulcrum-pins by means of the levers $i\,i$. The arms $h\,h$ are shown as having passed to their greatest distance from each other and as having commenced their stroke inward, and when the piston is driven to the opposite end of the cylinder the paddles will then be nearly in contact with each other, passing under the stern of the boat and approaching the keel on each side. On the return-stroke of the paddles from this last position, the paddle will shift to the reverse side of the triangular space $k\,k\,l$.

I have contemplated several modifications of this mode of propelling, one of which may be very conveniently and advantageously applied to twin boats, and is as follows: Instead of the two arms $h\,h$, one on each side of the boat, I intend in twin boats to have a single vibrating vertical shaft like $f\,f$, which shall carry two paddle-arms in a line with each other, one extending toward the stem and the other toward the stern of the boat. The paddle toward the stern will be made to operate in the manner of those represented in Fig. 1, and that toward the stem in the reversed position, so that it shall operate to draw the boat forward. A single boat, also, may be so constructed as to admit of the arrangement of the paddle-arms in the same way with that just described as applied to a twin boat. I have also contemplated the giving a continuous rotary motion to the shaft $f\,f$, carrying arms with two or more paddles similar in their general construction and operation to those above described, but so governed and directed in their change of position as to exert a continuous propelling power; but as this would render the apparatus much more complex I do not now think it necessary to particularize any special arrangement of the machinery for effecting this object. I have likewise proposed to cause the paddles $a\,a$ to move upon their fulcra during the continuance of their action on the water, so that they shall always stand at the same angle to the keel of the boat—say an angle of twenty-five degrees, more or less. Should I hereafter find it expedient to add this or either of the other improvements which I have contemplated to my present patent, I will do so after completing the details; but believing that the simple arrangements herein pointed out will be found to be not only sufficient, but actually the best in practice, I intend at present to rest my claims on these.

Having thus fully pointed out the nature of my invention and described the manner in which the same may be carried into operation, what I claim therein as new, and desire to secure by Letters Patent, is—

The manner of constructing and arranging the paddles $a\,a$ on the arms $h\,h$ with their shifting fulcra, the respective parts thereof being combined and operating substantially as herein fully made known.

Although I have considered and do consider the steam-engine that I have described and the paddles or sculls which are actuated thereby as constituting in their best form one combined and connected structure when so made as to have the greatest efficiency, it will be manifest that such paddles or sculls may be worked by means of an engine the piston of which is connected with a crank-shaft having a rotary motion, and it is to be understood, therefore, that I do not intend to limit myself in all cases to the use and employment of a steam-engine such as herein described, in combination with such paddles or sculls, but that I claim as of my invention the use of such paddles or sculls having shifting fulcra, and being otherwise constructed, arranged, and operating as herein set forth, by whatever motive power they may be actuated.

TRUMAN COOK.

Witnesses:
THOS. P. JONES,
EDWIN L. BRUNDAGE.